United States Patent [19]

Özveren

[11] Patent Number: 5,432,784
[45] Date of Patent: Jul. 11, 1995

[54] FLOW CONTROL METHOD AND APPARATUS FOR SYSTEMS WITH LONG DISTANCE LINKS

[75] Inventor: Cüneyt M. Özveren, Somerville, Mass.

[73] Assignee: Digital Equipment Corporation, Maynard, Mass.

[21] Appl. No.: 99,011

[22] Filed: Jul. 26, 1993

[51] Int. Cl.⁶ .................... H04L 12/56; H04J 3/16
[52] U.S. Cl. .................. 370/60.1; 370/94.2; 370/79
[58] Field of Search ............... 370/13, 17, 60, 60.1, 370/94.1, 94.2, 112, 79, 84; 375/38

[56] References Cited

U.S. PATENT DOCUMENTS

| | | | |
|---|---|---|---|
| 5,199,027 | 3/1993 | Barri | 370/60.1 |
| 5,285,446 | 2/1994 | Yonehara | 370/60.1 |
| 5,289,462 | 2/1994 | Ahmadi | 370/60.1 |

OTHER PUBLICATIONS

"Autonet: A High-Speed, Self-Configuring Local Area Network Using Point to Point Links", by Michael Shroeder, Andrew D. Birrell, Michael Burrows, Hal Murray, Roger M. Needham, Thomas L. Rodeheffer, Edwin H. Satterwaite, and Charles P. Thacker, published in IEEE Journal on Selected Areas in Communications, vol. 9, No. 8, Oct. 1991.
"The FCVC (Flow Controlled Virtual Channels) Proposal for ATM Neworks (DRAFT)", By H. T. Kung and Alan Chapman, posted on the Internet for comments Jun. 21, 1993.

Primary Examiner—Wellington Chin
Attorney, Agent, or Firm—A. Sidney Johnston; David A. Dagg

[57] ABSTRACT

A flow control system is disclosed, for a transmitting node and a receiving node. The transmitting node and the receiving node are linked together through multiple connections or virtual circuits. The receiving node includes a connection specific pool of buffers for receiving data transmission units from the transmitting node over each specific connection, and a common pool of buffers for storing data transmission units received from the transmitting node over any of the connections between the transmitting node and the receiving node. A flow control circuit in the transmitting node limits the number of data transmission units transmitted from the transmitting station, and not yet copied out of the receive buffers in the receiving node, to the total number of receive buffers in the receiving node. The flow control circuit in the transmitting node further controls the transmission of data transmission units on the multiple connections fairly, such that all connections are provided a proportional amount of the total available receive buffers in the receiving node. In an example embodiment, a global counter is used to maintain the total number of receive buffers containing data in the receiving node, and a global limit register contains the maximum number of receive buffers containing data in the receiving node allowed for a single connection.

18 Claims, 8 Drawing Sheets

FLOW CONTROL METHOD AND APPARATUS FOR SYSTEMS WITH LONG DISTANCE LINKS

FIELD OF THE INVENTION

The disclosed invention relates generally to communications networks using virtual circuits, and more particularly to communications networks using flow control to avoid dropping packets when the network is congested.

BACKGROUND

Flow control systems are used in communication networks to prevent packet loss due to lack of buffer resources at the receiving end of a transmission. In multiple virtual circuit architectures such as Asynchronous Transfer Mode (ATM), existing flow control systems require a fixed amount of buffering per virtual circuit. The total amount of buffering required to support flow control systems for multiple virtual circuit architectures therefore increases with the number of virtual circuits allowed per node.

In known virtual circuit based networks, flow control is applied on each link for every virtual circuit, independent of all other virtual circuits. A window based flow control scheme is used, in which a cell is a data transmission unit of a given length, and the window size equals a maximum number of cells r that can be transmitted during the round trip transmission delay between the transmitting node and the destination node.

In such known virtual circuit based networks, if v is the maximum number of virtual circuits allowed per destination node, then the total buffer requirement is rv receive cell buffers per destination node. Fairness may be achieved in such a flow control system, if other components of the system are fair. For example, virtual circuits may be serviced in a fair, say round robin, fashion. However, as the distance between the transmitting node and the destination node increases, the total buffer requirement per destination node increases similarly. For this reason buffer requirements in these systems can be impractical, where very long maximum distance links are permitted.

For example, in a known system where the maximum number of virtual circuits allowed per destination node is $2^{14}$, having a link speed of 622 megabits per second, there is required over 1 gigabyte of receive buffer memory in a destination node across a 100 kilometer link. This amount of receive buffer memory is used to ensure there is no performance limitation due to lack of receive buffers in the destination node. In such a known system, over 10 gigabytes of receive buffer memory are required in a destination node over a 1000 kilometer link.

As shown above, total buffer requirements of existing flow control systems in communications systems using virtual circuits are prohibitively costly where long distance links between nodes are allowed. For these reasons and others, there is therefore a need for a flow control system requiring fewer total receive buffers than existing systems.

SUMMARY

In accordance with principles of the invention, there is provided a flow control system for communications networks having long distances between nodes, and requiring fewer receive buffers than existing systems.

The herein disclosed flow control system is applicable to any communications network having multiple connections between a transmitting node and a receiving node over which data transmission units (DTUs) are exchanged. After a connection has been established between the transmitting node and the receiving node, it is said to be active. An example of a connection between a transmitting node and a receiving node is a Virtual Circuit (VC). Examples of DTUs used on various existing communications networks, and familiar to those skilled in the art, include cells, frames and packets.

The disclosed flow control system includes a common pool of receive buffers in the receiving node for storing DTUs received from the transmitting node over any of the multiple connections between the transmitting node and the receiving node. The receiving node further includes a connection specific pool of receive buffers associated with each one of the potential multiple connections between the transmitting node and the receiving node. Each connection specific pool is used for storing DTUs received over the associated connection. Thus, there is a connection specific pool of receive buffers reserved for each possible connection that may be established between the transmitting node and the receiving node.

A flow control circuit in the transmitting node guarantees that no DTU transmitted from the transmitting node to the receiving node is lost. The flow control circuit in the transmitting node further guarantees that when the number of active connections between the transmitting node and the receiving node does not exceed a predetermined number, there is optimal throughput between the transmitting node and the receiving node over all active connections.

The flow control circuit in the transmitting node includes a global counter to count the number of DTUs transmitted from the transmitting node to the receiving node, and not yet transferred out of the receive buffers in the receiving node. When the global counter exceeds the number of receive buffers in the common pool of receive buffers in the receiving node, the number of DTUs transmitted over each individual connection, and not yet transferred out of the receive buffers in the receiving node, is limited to the number of receive buffers in the connection specific pool of receive buffers associated with each one of the multiple connections between the transmitting node and the receiving node.

An example of advantages provided by the flow control system are apparent in the following example system, which in previous systems would have required storage for rv cells for each destination node, where r is the number of cells that can be transmitted during the round trip delay between the transmitting node and the destination node, and v is the maximum possible number of potential VCs (virtual circuits) with each destination node. The system herein disclosed provides maximum throughput for a predetermined number x of VCs. The number x is thus equal to the number of active VCs allowed with the destination node, where each VC has maximum throughput. In this example, the number x can be much lower than v, since the number of active VCs with a given destination node is typically much less than $2^{14}$. If the link speed for the example embodiment is 622 megabits per second (Mb/s), a value for x could reasonably be 100, since more than 100 active VCs results in each VC getting approximately 6 Mb/s bandwidth of throughput.

The flow control system herein described allows maximum throughput on each active VC, at very little additional complexity, provided that the number of active VCs with each destination node is at most x. In an embodiment where the size of the connection specific pool of receive buffers is equal to one (1), the buffer requirement is v+rx, much less than rv. For example, if x is 100 the system would only require approximately 8 FIB (megabytes) for receive buffers in a destination node 100 km away and 64 MB for receive buffers in a destination node 1000 km away.

These and other features and advantages of the present invention will become apparent from a reading of the detailed description in conjunction with the attached drawings in which like reference numerals refer to like elements in the several views.

DETAILED DESCRIPTION

Virtual Circuits

In computer networks, a logical connection between a first node and a second node is known as a virtual circuit. Virtual circuits are used to avoid having to make routing decisions for every packet or cell sent. Generally, when a virtual circuit is established, a route from the first node to the second node is chosen as part of the connection setup. That route is used for all traffic flowing over the connection.

To allow Data Transmission Units (DTUs) sent over a virtual circuit to always take the same route, each node along the route maintains a virtual circuit table with one entry per virtual circuit. Typically, each DTU travelling over a given virtual circuit contains a field or fields which identifying the virtual circuit over which the cell is transmitted. Further, the field or fields in the cell typically identify an entry in a virtual circuit table within each node along the route.

A virtual circuit table entry contains control bits for the associated virtual circuit, for example a control bit that enables and disables transmission on the associated virtual circuit. A discussion of virtual circuits is given in many textbooks, for example the book by Andrew S. Tanenbaum, "Computer Networks", Second Edition, published by Prentice-Hall, Inc., a division of Simon and Shuster, Englewood Cliffs, N.J., 1988, see particularly pages 280 through 284, all disclosures of which are herein included by reference.

Virtual circuits may also be used to reserve buffers in the first node and the second node, and within intermediate nodes between the first node and second node. In this way a virtual circuit can be used to guarantee a predetermined level of throughput between the first node and the second node.

Data Transmission Units

Figure 1A:
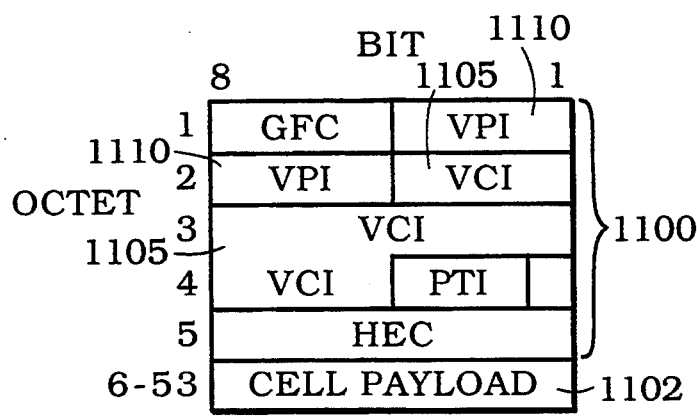
FIG. 1a is a diagram showing the format of an example data transmission unit.

FIG. 1a is a diagram showing the format of an example Data Transmission Unit (DTU) known as a cell. A cell is one example of a data transmission unit used to pass data and control information between network nodes. Other types of DTUs are known as "packets", and "frames". The description herein involves cells, however it will be evident to one skilled in the art of data and computer communications that the concepts disclosed may also be applied to systems using other DTUs, for example packets or frames.

The cell DTU is used in communications systems based on Asynchronous Transfer Mode (ATM). A discussion of ATM is given in the book by Martin de Prycker, "Asynchronous Transfer Mode: A Solution for Broadband ISDN", published by Ellis Horwood, N.Y. 1991, all disclosures of which are herein included by reference.

FIG. 1a shows a cell having a header 1100, the header 1100 within octets 1–5 of the cell, and a payload 1102, within octets 6—53. The header 1100 includes Virtual Channel Identifier (VCI) 1105, and Virtual Path Identifier (VPI) 1110. Together the VCI and VPI fields identify a virtual circuit over which the cell is transmitted. The payload 1102 contains data or control information.

Figure 1B:
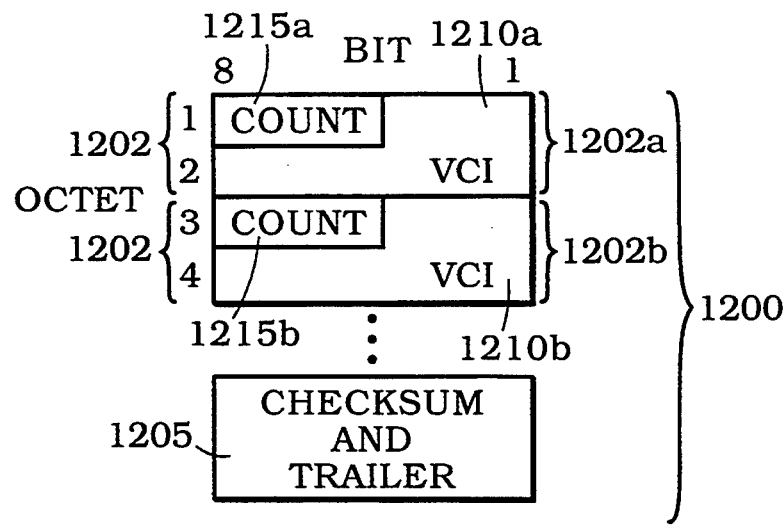
FIG. 1b is a diagram showing an example of a buffer released message.

FIG. 1b is a diagram showing a first example of a buffer released message. The example buffer released message of FIG. 1b indicates to a transmitting node the availability of receive buffers in a receiving node. The buffer released message shown in FIG. 1b is a cell DTU, having a body 1200, and a checksum and trailer field 1205. The body 1200 includes up to 24 entries 1202, including for example a first entry 1202a, and a second entry 1202b. Each entry contains a count field 1215, and a Virtual Circuit Identifier field 1210.

The count field 1215 for a given entry 1202 contains information regarding available receive buffers in the node from which the buffer released message was sent, for traffic on the virtual circuit indicated by the VCI field in the entry. Such information in the count field 1215 includes for example the total number of receive buffers currently available to store data received on the virtual circuit indicated by the VCI field 1210. In the alternative, the count field 1215 includes the number of receive buffers which have been become available to store data received on the virtual circuit indicated by the VCI field 1210.

Figure 1C:
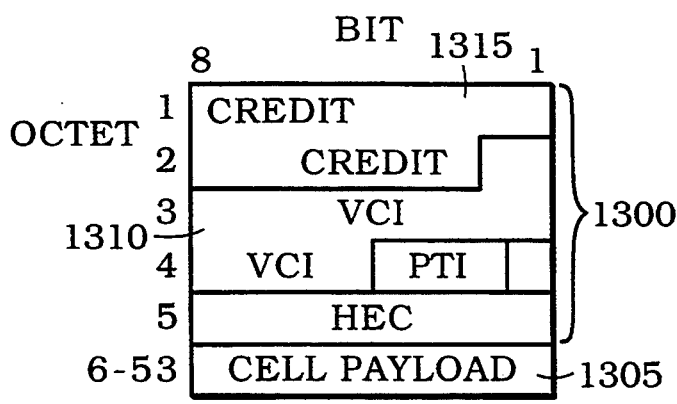
FIG. 1c is a diagram showing a second example of a buffer released message.

FIG. 1c is a diagram showing a second example of a buffer released message. The buffer released message of FIG. 1c is a cell DTU, in which information regarding available receive buffers is piggy-backed. The buffer released message of FIG. 1c has a header 1300, and a payload 1305. The payload 1305 contains data or control information. The header 1300 includes a credit field 1315, and a Virtual Circuit Identifier (VCI) field 1310. The VCI field 1310 identifies the VC over which the buffer released message is transmitted.

The credit field 1315 includes information regarding available buffers in the node from which the buffer released message is transmitted. Such information in the credit field 1315 includes for example the total number of receive buffers currently available to store data received on the virtual circuit indicated by the VCI field 1310. In the alternative, the credit field 1315 includes the number of receive buffers which have been become available to store data received on the virtual circuit indicated by the VCI field 1310.

Flow Control System

Figure 1D:
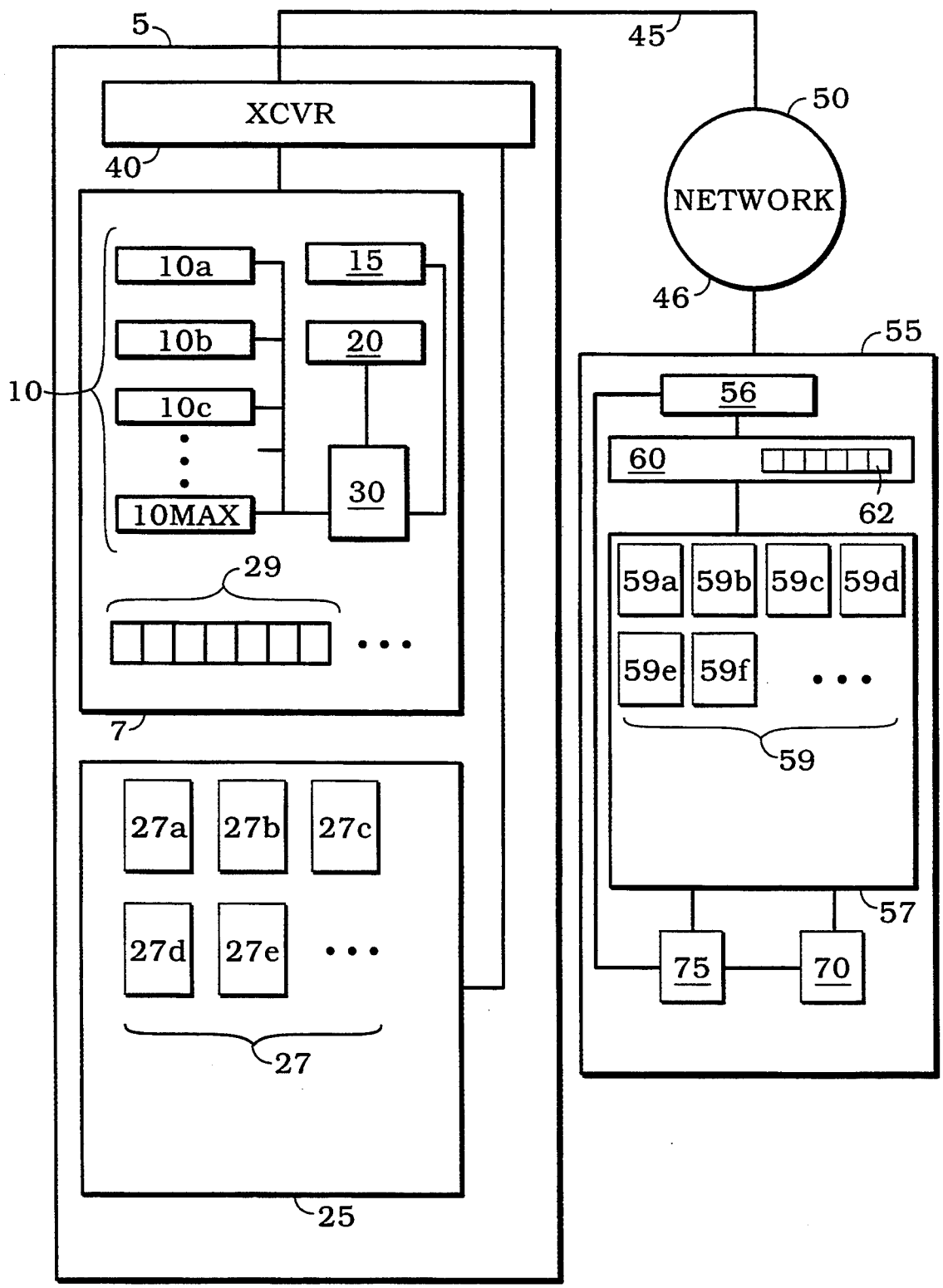
FIG. 1d is a logic drawing of a first embodiment of a flow control apparatus.

FIG. 1d is a logic drawing of the elements in a flow control apparatus. A first network node 5 is shown containing a transceiver circuit 40, a flow control circuit 7, and a memory 25. The transceiver circuit 40 is coupled with a network 50 via a communications link 45. The transceiver circuit 40 is further coupled with the flow control circuit 7, and the memory 25.

The flow control circuit 7 contains a set of one or more virtual circuit outstanding cell counters 10, including virtual circuit outstanding cell counters 10a, 10b, 10c . . . 10 max, where max is the maximum possible number of potential virtual circuits with a second node 55. The virtual circuit outstanding cell counters 10, as well as a global limit register 20, and a global counter 15, are coupled with a flow control logic 30.

In the example embodiment of FIG. 1d, the virtual circuit outstanding cell counters 10, global counter 15, and global limit register 20 are contained in the flow control circuit 7. Alternatively, it will be evident to those skilled in the art that some or all of virtual circuit outstanding cell counters 10, global counter 15, and global limit register 20 may be memory locations allocated by a program running on a node processor (see FIG. 10). It will further be evident to those skilled in the art that the network 50 could be a local area network (LAN), a wide area network (WAN), a metropolitan area network (MAN), or other type of communications system.

The flow control circuit 7 further contains a virtual circuit table 29, having an entry for every possible virtual circuit between the first network node 5 and other network nodes, and a flow control logic 30.

The second network node 55 is coupled with the network 50, via a link 46. The second network node 55 includes a transceiver 56 coupled with the LAN 50 and also coupled with a second flow control circuit 60. The second flow control circuit 60 includes a virtual circuit table 62 having an entry for every possible virtual circuit between the second network node 55 and other network nodes. The second flow control circuit 60 is also coupled with a memory 57. The memory 57 in the second network node 55 includes a set of one or more receive buffers 59, for storing DTUs received from the first network node 5.

The total number of receive buffers 59 is equal to $$(v * min) + (x * r)$$

where v is the maximum number of potential virtual circuits that can be established between the first network node 5 and the second network node 55, min is a minimum number of buffers, reserved for each potential virtual circuit between the first network node 5 and the second network node 55, x is the number of virtual circuits that can be established for the link 46 with the first network node 5 before throughput between first network node 5 and second network node 55 is limited by a lack of receive buffers, and r is the number of cells that can be transmitted during one round trip delay between the first network node 5 and the second network node 55.

Thus each potential virtual circuit is reserved min receive buffers. Additionally, there is a shared pool xr of receive buffers that is shared for DTUs received over any VC between the first network node 5 and the second network node 55. In an example embodiment, min is equal to 1 receive buffer, where a receive buffer is of sufficient size to store one cell DTU.

Also in the second network node 55 in FIG. 1 is shown a data transferring process 70, coupled with the memory 57. Further in network node 55 is shown a buffer released message generating process 75, coupled with the data transferring process 70 and the transceiver 56. The data transferring process 70 and buffer released message generating process 75 may either be implemented as programs running on a node processor within the second network node 55, or as logic processes within an ASIC. Fop example, the data transferring process 70 may be a software process within an end node, for copying the data from the receive buffers 59 into user process memory. As an alternative example, the data transferring process 70 may be a software or logic process within a switch, bridge or router for transferring data out of the receive buffers 59, and transmitting the data onto an output port.

The memory 25 in the first network node 5 further contains a set of one or more data cells 27, the data cells 27 containing data to be transmitted by the network node 5 to other nodes on the network 50.

It will be evident to those skilled in the art of computer and data communications that the flow control circuit 7, and the transceiver circuit 40 in the first network node 5, as well as the second flow control circuit 60, the data transferring process 70, the buffer released message generating process 75, and the transceiver 56 in the second network node 55, may be implemented using standard integrated circuit devices. A further discussion of such devices is given in many textbooks, for example "An Engineering Approach to Digital Design", by William I. Fletcher, published by Prentice-Hall, Englewood Cliffs, N.J., 1980, all disclosures of which are herein included by reference.

It will further be evident to one skilled in the art that the above listed elements may be implemented using one or more Application Specific Integrated Circuits (ASICs), or Programmable Logic Devices (PLDs). A further discussion of ASIC and PLD design is given in many textbooks, for example "VLSI Handbook", by Joseph DiGiacomo, published by McGraw-Hill Publishing Company, N.Y., 1989, all disclosures of which are herein included by reference.

During operation of the elements shown in FIG. 1d, first network node 5 and second network node 55 establish one or more virtual circuits with each other. For each virtual circuit between first network node 5 and second network node 55, there is an entry in virtual circuit table 29 within the first network node and an entry in virtual circuit table 62 within the second network node. Cells transmitted between the first network node 5 and the second network node 55 contain indication of a specific virtual circuit over which they are transmitted, for example a field containing a virtual circuit number indexing entries in the virtual circuit tables 29 and 62.

Within the first network node 5, the flow control logic 30 initializes each virtual circuit outstanding cell counter 10 with zero when each virtual circuit is established. In an alternative embodiment, the virtual circuit outstanding cell counter 10 for a specific virtual circuit is initialized to some number greater than zero if the bandwidth allocated for that specific virtual circuit is to be limited.

Again referring to the operation of the elements in FIG. 1d, the flow control logic 30 maintains the global counter 15 as the total number of outstanding cells transmitted from the first network node 5 to the second network node 55. Outstanding cells are those cells transmitted from the first network node 5 to the second network node 55, which have not been transferred by the data transfer process 70 in the second network node 55.

The flow control logic 30 also maintains the global limit register 20 based in part on the value in the global counter 15. There is a global counter and global limit register within the first network node 5 for each possible remote node with which the first network node 5 has one or more virtual circuits.

The flow control logic 30 initializes the global counter 15 and the global limit register 20 at power up, and whenever the link between the first network node 5 and the second network node 55 is broken and then subsequently re-established. In the example embodiment, the flow control logic 30 initializes the global counter to zero and the global limit register to r, where r is the number of cells that can be transmitted by the first network node 5 during the round trip propagation delay between the first network node 5 and the second network node 55.

Further during operation of the elements in FIG. 1, the transceiver 56 in the second network node 55 receives one of the data cells 27 transmitted by the first network node 5, and copies it into one of the receive buffers 59. Subsequently, the data transferring process 70 transfers the data from the one of the receive buffers 59. The buffer released message generating process 75 then detects that the data was transferred from the receive buffer, and sends a receive buffer released message to the first network node 5 indicating that the one of the receive buffers 59 is available to store another cell transmitted by the first network node 5.

Incremental and Absolute Feedback of Receive Buffer Usage in the Receiving Node

There are two alternative mechanisms for providing feedback from the second network node 55 to the first network node regarding the availability of the receive buffers 59: Incremental and Absolute. In an incremental feedback embodiment, the buffer released message generating process 75 reports the transfer of the receive buffers 59 to the first network node 5 either individually or in batches. For example, the buffer released message generating process 75 sends a buffer released message after each one of receive buffers 59 is transferred, or sends a buffer released message after every n of receive buffers 59 are transferred. Subsequent to receipt of the buffer released message by the first network node 5, the flow control logic 30 updates the virtual circuit outstanding cells counters 10 as well as the global counter 15 and the global limit register 20.

In an absolute feedback embodiment, the buffer released message generating process 75 reports the total number of used receive buffers 59 for a given VC, either periodically, or when the total number of unavailable receive buffers 59 exceeds a predetermined number.

Further in the absolute feedback embodiment, upon receipt of the buffer released message by the first network node 5, the flow control logic 30 in the first network node 5 corrects the number of buffers in the buffer released message for any cells transmitted by the first network node 5 to the second network node 55 during the last time period equal to one round trip delay between the two network nodes. This correction is accomplished by one of two alternative correction systems: In the first correction system, the flow control logic 30 maintains running count of the cells being transmitted from first network node 5 to the second network node 55. When a buffer released message is received, the flow control logic 30 adds the actual number of cells transmitted during the round trip delay time preceding receipt of the message to the number of used buffers indicated by the buffer released message. This result is then used to update the appropriate virtual circuit outstanding cell counter 10, as well as the global counter 15 and the global limit register 20.

In the second correction system, the flow control logic 30 maintains a number num equal to the maximum possible number of cells that could be transmitted during one round trip delay between the first network node 5 and the second network node 55. When a buffer released message is received by the first network node 5, the flow control logic 30 adds num to the number of unavailable receive buffers indicated in the buffer released message. The result of the addition is then used to update the appropriate virtual circuit outstanding cell counter 10, as well as the global counter 15 and the global limit register 20.

Figure 2:
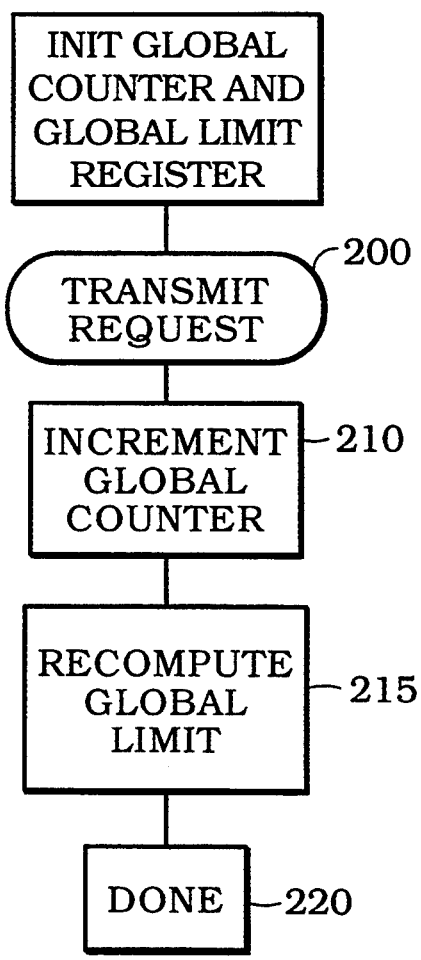
FIG. 2 is a flow chart showing the steps of a method for maintaining a global counter and a global limit register during cell transmission.

FIG. 2 shows the steps performed as one of data cells 27, (27a for purposes of example), is transmitted from first network node 5 of FIG. 1. The steps of FIG. 2 are performed by the flow control logic 30 shown in FIG. 1.

Now with reference to the control flow shown in FIG. 2, the operation of the elements in FIG. 1 is further described. In FIG. 2, data cell 27a is transmitted by the first network node 5 to the second network node 55 in step 200. Next, in step 210, the flow control logic 30 responds to the transmission in step 200 by incrementing the global counter 15. Finally in step 215, the flow control logic 30 recomputes the value of the global limit register 20 based on the value of the global counter 15.

After the data cell 27a is transmitted from the first network node 5, it is received by the second network node 55. The transceiver 56 within the second network node 55 receives the data cell 27a and writes the data cell 27a into one of the receive buffer 59, for example receive buffer 59a.

Subsequent to the second network node 55 receiving and storing the data cell 27a in receive buffer 59a, the data transferring process 70 in the second network node 55 transfers the data out of receive buffer 59a. After the data transferring process has transferred the data out of receive buffer 59a, the receive buffer 59a available to store more data from the network 50, and is thus considered to be released. The buffer released message generating process 75 in the second network node 55 then provides indication of the availability of the released receive buffer 59a to the first network node 5 by sending a buffer released message to the first network node 5.

Figure 3:
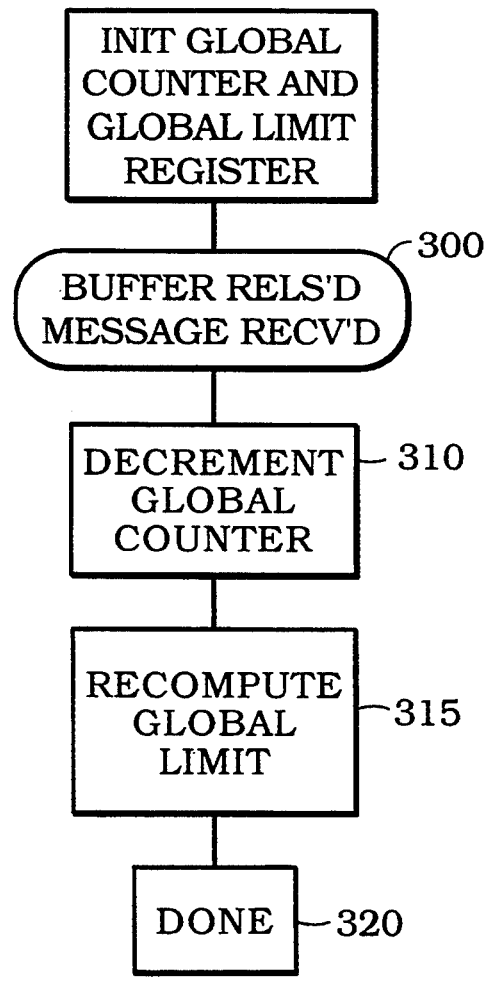
FIG. 3 is a flow chart showing steps of a method for maintaining a global counter and a global limit register during receipt of a buffer released message.

FIG. 3 shows the steps performed by the flow control logic 30, within the first network node 5, when a buffer released message is received from the second network node 55. First the buffer released message is received in step 300. Next, the global counter 15 is decremented in step 310. The method for decrementing the global counter 15 is dependent on the type of feedback mechanism used. In an embodiment where the incremental feedback mechanism is used, the amount the global counter 15 is decremented is the number of the receive buffers 59 that the buffer released message frame indicates have been released, either since the virtual circuit was established, or since the last buffer released message was sent from the second network node 55.

In an embodiment where the absolute feedback mechanism is used, the buffer released message indicates a number of buffers equal to the number of receive buffers 59 in the second network node 55 unavailable to store data sent over the associated VC. The flow control logic 30 first corrects the number of buffers indicated in the buffer released message for any cells that may have been transmitted from the first network node 5 over the associated VC during the last round trip delay period. Then the global counter 15 is updated based on the corrected number of used buffers in the second network node 55.

Following step 310 in FIG. 3, the value of the global limit register 20 is recomputed in step 315 by the flow control logic 30 shown in FIG. 1. The steps of recomputing the value of the global limit register 20 are described below. Following step 315, the processing of the received buffer release message completes in step 320, until the next buffer release message is received.

Figure 4:
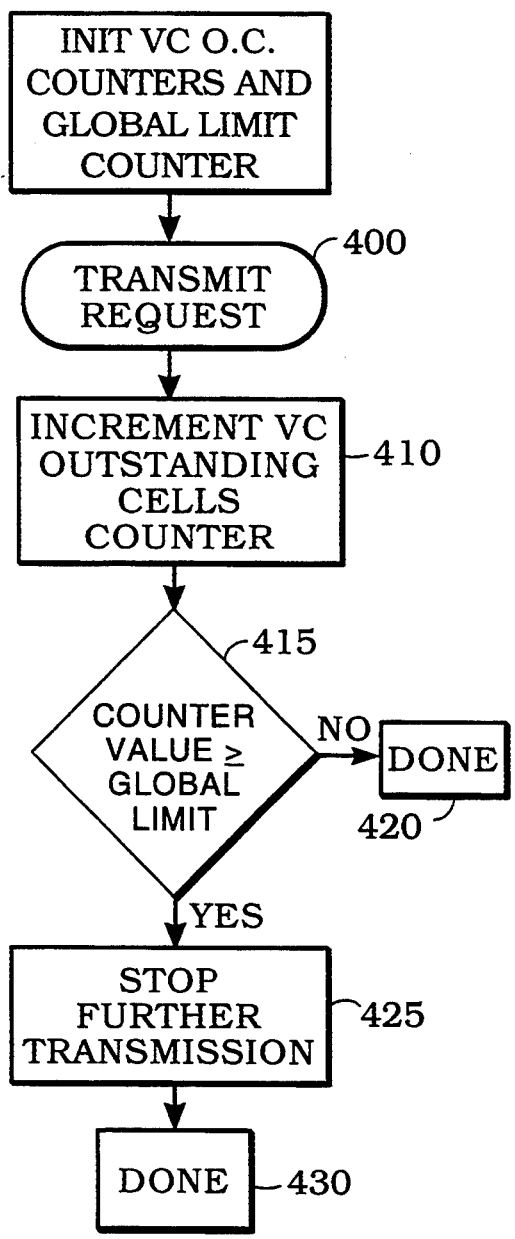
FIG. 4 is a flow chart showing steps of a method for maintaining an outstanding cell counter for a virtual circuit during cell transmission.

FIG. 4 shows the steps performed to maintain virtual circuit outstanding cell counters 10 when one of data cells 27 is transmitted. The steps of FIG. 4 would be performed by the flow control logic 30 in the first network node 5 of FIG. 1.

First in FIG. 4, one of data cells 27 (for example 27a) is transmitted over a given virtual circuit between the first network node 5 and the second network node 55 in step 400. Next, the virtual circuit outstanding cell counter 10 for that given virtual circuit (for example virtual circuit outstanding cell counter 10a) is incremented in step 410. Then in step 415 the virtual circuit outstanding cell counter 10a is compared with the value of the global limit register 20. If the virtual circuit outstanding cell counter 10a is less than the global limit register 20, processing completes for this cell transmission in step 420.

Further in FIG. 4, if the virtual circuit outstanding cell counter 10a is greater than or equal to the global limit register 20, step 425 is performed. In step 425, the flow control logic 30 stops further transmission on the virtual circuit corresponding to virtual circuit credit counter 10a. Transmission on a virtual circuit can, for example, be stopped by setting a Transmission Disable bit in the entry for that virtual circuit in the virtual circuit table 29 of FIG. 1. Following step 425, the process completes for this cell transmission in step 430.

Figure 5:
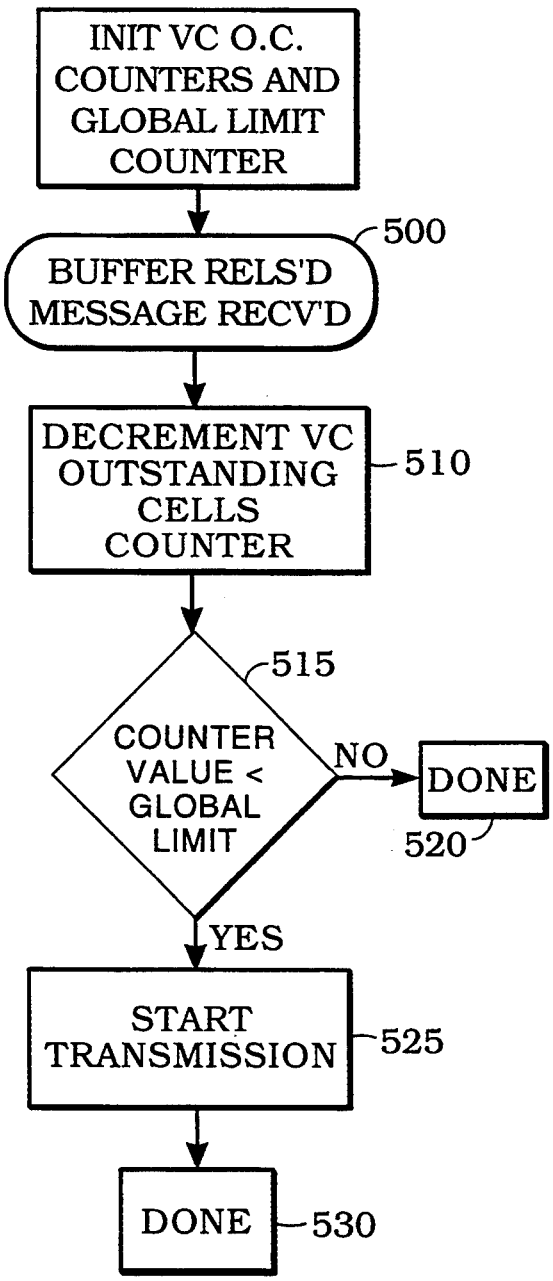
FIG. 5 is a flow chart showing steps of a method for maintaining an outstanding cell counter for a virtual circuit during receipt of a credit return frame.

FIG. 5 shows the steps performed to maintain the virtual circuit outstanding cell counters 10 of the first network node 5 in FIG. 1 when a buffer released message is received. First in step 500, a buffer released message is received by the first network node 5. Next, in step 510, the flow control logic 30 writes or decrements the one of virtual circuit outstanding cell counters 10 indicated by the buffer released message (for example virtual circuit outstanding cell counter 10a).

Whether the virtual circuit outstanding cell counter 10a is decremented or written in step 510 depends on whether an incremental or absolute feedback mechanism is used. In an embodiment where an incremental feedback mechanism is used, the virtual circuit outstanding cell counter 10a is decremented by the number of receive buffers 57 that the buffer released message indicates have been released.

Where an absolute feedback mechanism is used, the buffer released message contains a current value reflecting the receive buffers 59 in the second network node 55 that are currently storing data received over the VC associated with the buffer released message. In that mechanism, the virtual circuit outstanding cell counter 10a is written with the current value corrected for the round trip delay between the first network node 5 and the second network node 55.

Continuing with reference to the elements in FIG. 5, step 510 is next followed by step 515. In step 515, the flow control logic 30 compares the virtual circuit outstanding cell counter 10a with the value of the global limit register 20. If the value of the virtual circuit outstanding cell counter 10a is not less than the global limit register 20 then the process completes in step 520 for this buffer released message.

If the value of the virtual circuit outstanding cell counter 10a is greater than the global limit register 20, then the flow control logic 30 continues processing with step 525. In step 525, if transmissions for the virtual circuit corresponding with virtual circuit outstanding cell counter 10a had previously been disabled, transmissions are re-enabled for that virtual circuit. Following step 525, the process completes for this buffer released message in step 530.

Figure 6:
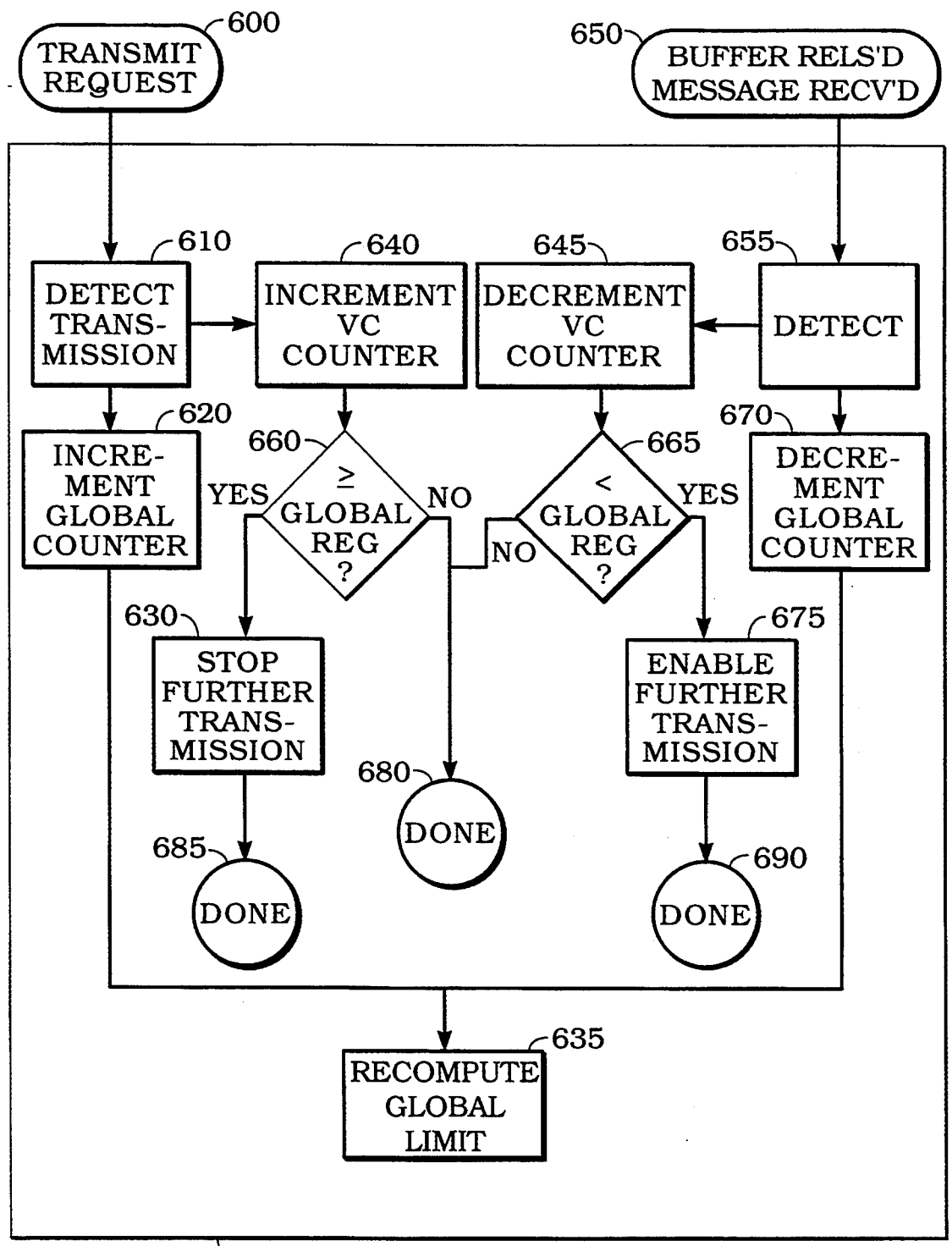
FIG. 6 is a detailed logic diagram of the flow control logic shown in FIG. 1.

FIG. 6 is a detailed logic diagram of the flow control logic 30 shown in FIG. 1. In the example embodiment of FIG. 6, the flow control logic 30 is an ASIC, containing several logic processes. FIG. 6 shows the flow control logic 30 having a transmission request detecting process 610, coupled with a virtual circuit counter incrementing process 640 and a global counter incrementing process 620. The virtual circuit incrementing process 640 is coupled with a first comparison process 660. The global counter incrementing process 620 is coupled with a global limit recomputing process 635. The first comparison process 660 is coupled with a transmission stopping process 630.

FIG. 6 further shows a buffer released message detecting process 655, coupled with a virtual circuit counter decrementing process 645 and a global counter decrementing process 670. The virtual circuit decrementing process 645 is coupled with a second comparison process 665. The global counter decrementing process 670 is coupled with the global limit recomputing process 635. The second comparison process 665 is coupled with transmission enabling process 675.

During operation of the elements in FIG. 6, when a transmission request 600 is present, the transmission request detecting process 610 detects the transmission request 600. An example of a transmission request 600 is a request by a user in a first network node to send a cell DTU to a second network node over a virtual circuit between the first network node and the second network node.

Following the cell transmission request detecting process 610 detecting the transmission request 600, the global limit recomputing process 635 recomputes the value of the global limit register for the destination node of the transmission request, for example, the second network node. Also following the cell transmission request detecting process 610 detecting the transmission request 600, the virtual circuit counter incrementing process 640 increments the virtual circuit outstanding cell counter for the virtual circuit on which transmission is requested.

Following the virtual circuit counter incrementing process 640 incrementing the virtual circuit outstanding cell counter for the virtual circuit of the transmission request 600, the incremented virtual circuit outstanding cell counter is compared with the value of the global limit register for the virtual circuit on which transmission is requested. If the incremented virtual circuit outstanding cell counter is greater than or equal to the global limit register, then the transmission stopping process 630 stops further transmissions on that virtual circuit. The current transmission request 600 is thus stopped. If the incremented virtual circuit outstanding cell counter is less than the global limit register, then the transmission request 600 is allowed to complete, and the cell DTU transmitted from the first network node to the second network node.

In an example embodiment, the logic processes 620 and 635 may execute in parallel with the logic processes 640, 660, and 630, subsequent to the transmission request detecting process 610 detecting a transmission request.

Further during operation of the elements of FIG. 6, when a buffer released message is received by the first network node, receipt 650 of the buffer released message is detected by the buffer released message detecting process 655. An example of a buffer released is a cell DTU received from a second network node, over a virtual circuit, indicating the number of receive buffers that have been released since a previous buffer released message was sent from the second network node.

Following the buffer released message detecting process 655 detecting the receipt 650 of the buffer released message, the global counter decrementing process 670 decrements the global counter for the second network node from which the buffer released message was received. Subsequent to the global counter decrementing process 670 decrementing the global counter, the global limit recomputing process 635 recomputes the value of the global limit register.

Also following the buffer released message detecting process 655 detecting the receipt 650 of the buffer released message, the virtual circuit counter decrementing process 645 decrements the outstanding cell counter for the virtual circuit on which the buffer released message was received. After completion of the virtual circuit counter decrementing process 645, the second comparison process 665 compares the decremented outstanding cell counter with the global limit register. If the decremented outstanding cell counter is less than the global limit register, then the transmission enabling process 675 will enable transmission on the virtual circuit over which the buffer released message was received.

Recomputing the Global Credit Limit

Figure 7:
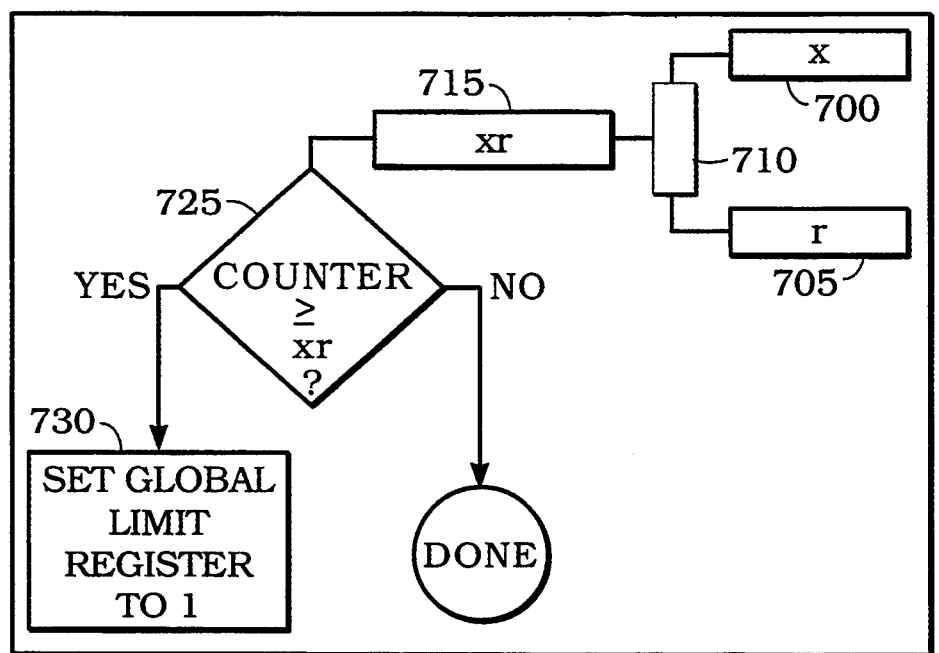
FIG. 7 is a detailed logic diagram of an embodiment of the logic for recomputing the global limit shown in FIG. 6.

FIG. 7 is a detailed logic diagram of the logic process 635 from FIG. 6, in which the value of the global limit register is recomputed when a cell is transmitted, and when a buffer released message is received. The elements in FIG. 7 set the value of the global credit limit register to 1 whenever the value of the global counter is greater than or equal to $xr$, where $x$ is the number of virtual circuits which have maximum throughput between a first network node and a second network node, and $r$ is the number of cells that can be transmitted during the round trip delay between the first network node and the second network node.

Further with reference to FIG. 7, a first register 700 is shown having a value $x$, $x$ being equal to the number of active virtual circuits which are allowed maximum throughput between the network node and the second network node. A second register 705 is shown having a value $r$, $r$ being equal to the number of cells that can be transmitted during the round trip delay between the first network node and the second network node.

An Arithmetic Logic Unit (ALU) 710 is shown coupled with the first register 700 and the second register 705. The ALU 710 is further coupled with an output register 715. The output register 715 is coupled with a comparison process 725. The comparison process 720 is coupled with a global limit setting process 730.

During operation of the elements in FIG. 7, the ALU multiplies the values in the first register 700 and the second register 705, and writes the result, $xr$, into the output register 715. Next, the comparison process 725 compares the value in the output register 715 with the value of the global counter for the second network node. When the value of the global counter for the second network node is greater than or equal to the value in the output register 715 ($xr$), the global limit setting process 730 sets the global limit register for the second network node to one.

Figure 8:
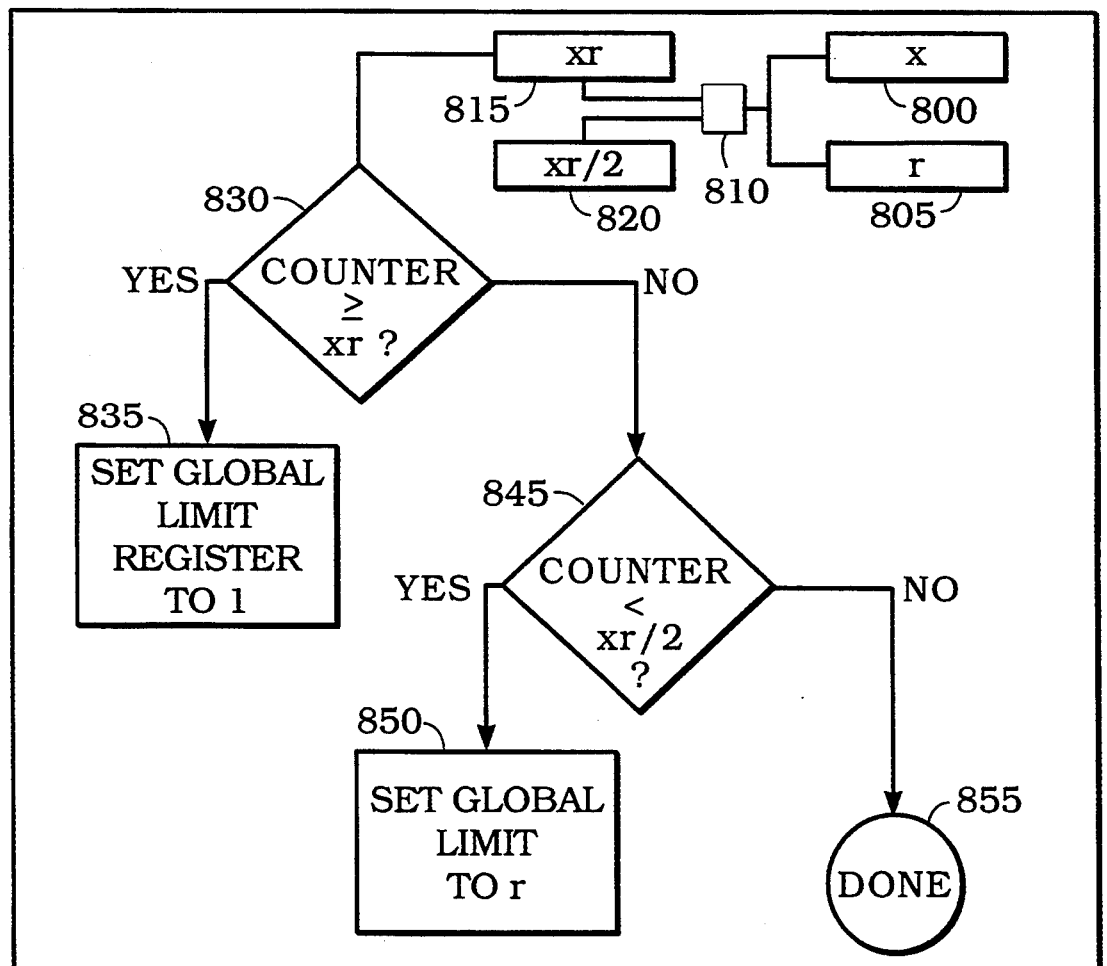
FIG. 8 is a detailed logic diagram of an alternative embodiment of the logic for recomputing the global limit shown in FIG. 6.

An alternative embodiment of the logic process 635 shown in FIG. 7 are shown as a logic diagram in FIG. 8. FIG. 8 is a detailed logic diagram of the logic process 635 from FIG. 6. The embodiment shown in FIG. 8 builds hysteresis into the embodiment shown in FIG. 7. First, some low water mark, for example $xr/2$, is determined. As in FIG. 7, the global credit limit is set to 1 whenever the global counter equals or exceeds $xr$, but it is set back to $r$ only when the global counter falls below the low water mark, for example $xr/2$.

Further with reference to FIG. 8, a first register 800, having a value $x$, and a second register 805, having a value $r$, are coupled with an ALU 810. The ALU 810 is further coupled with a first output register 815 and a second output register 820. The first output register 815 and second output register 820 are coupled with a first comparison process 830. The first comparison process 830 is coupled with a global limit register setting process 835, and a second comparison process 845. The second comparison process 845 is coupled with a second global limit register setting process 850.

During operation of the elements shown in FIG. 8, the ALU 810 multiplies contents of the first register 800 and the contents of the second register 805, and passing the result, $xr$, into the first output register 815. The ALU 810 further divides the value of first output register by two, and passing the result, $xr/2$, into the second output register 820.

Further during operation of the elements shown in FIG. 8, subsequent to the ALU 810 passing the results into the first output register 815 and second output register 820, the first comparison process 830 compares the value of the global counter with xr. When the global counter is greater than or equal to the xr, the global limit setting process 835 sets the global limit register to 1. When the global counter is less than xr, the second global limit setting process 850 sets the global limit register to r.

In another alternative embodiment of the logic process 635, values are assigned to the global limit continuously between 1 and r, to achieve the following: Given a fixed traffic distribution, at steady state, the buffer usage is divided equally between all the active VCs on each link. This can either be done by estimating the number of active VCs, say a, and setting the global credit limit to rx/a, or with a control loop that distributes the resources evenly regardless of the knowledge of a. The control loop is based on the parameters for the particular architecture, such as link length and memory size.

Further with regard to the logic process 635 of FIG. 6, typical incremental feedback mechanisms include a synchronization scheme which is executed periodically in order to compensate for any acknowledgement cells that may be lost. Such synchronization schemes can be applied in a straightforward fashion since the global counter value is the sum of the individual VC counter values. Simply, any correction made by the particular Synchronization method is applied also to the global counter value. For example, if the VC is torn down and replaced for synchronization purposes, its last global counter value is subtracted from the global counter.

Receive Buffer Organization

Figure 9:
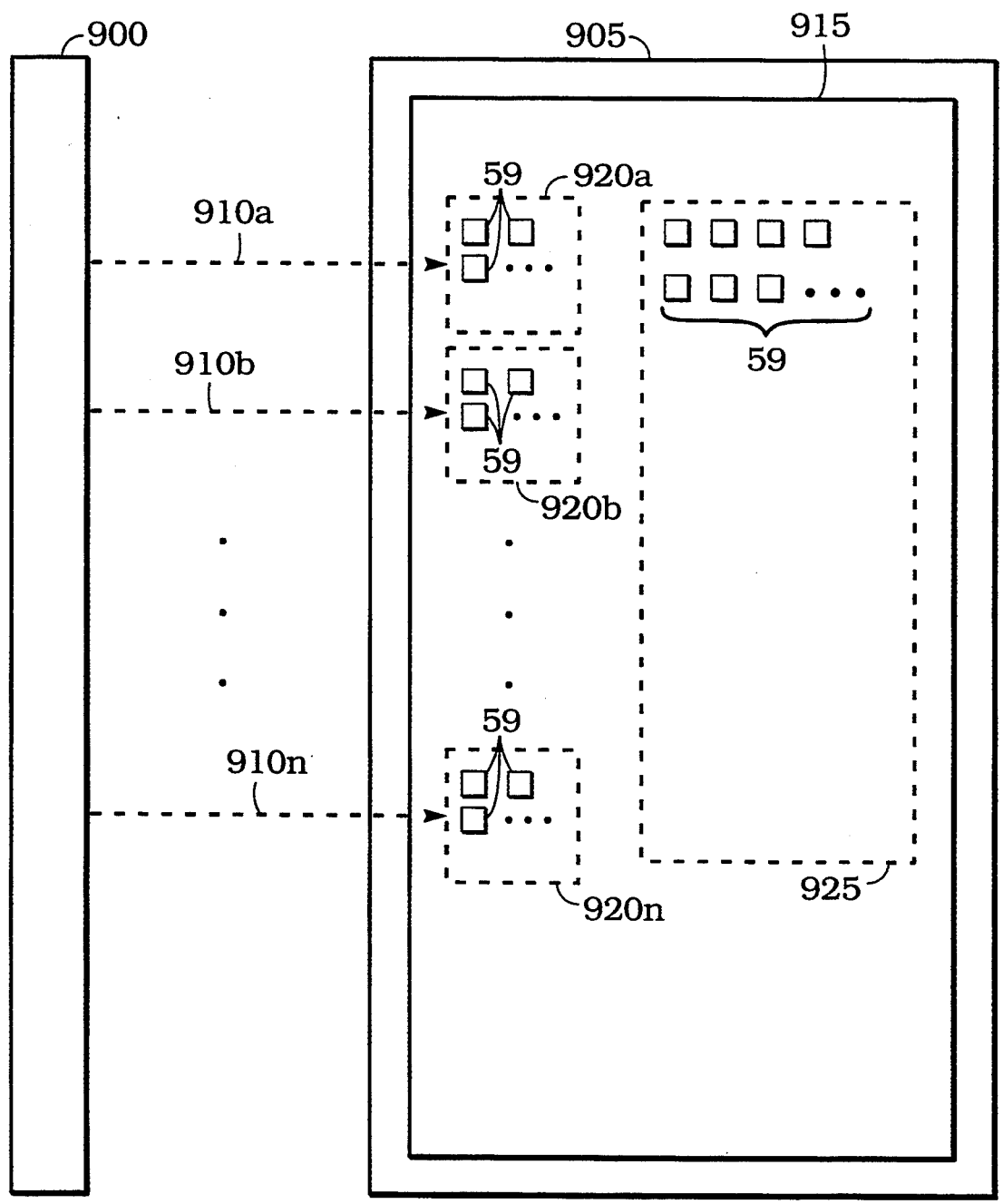
FIG. 9 is a drawing of a memory in a network node showing the allocation of receive buffers.

FIG. 9 shows a more detailed drawing of the receive buffers 59 shown in FIG. 1d. In FIG. 9, a first network node 900, and a second network node 905, have a number of virtual circuits 910a, 910b through 910n between them. A memory 915 in the second network node 905 contains receive buffers 59 for storing DTUs received from the first network node 900, over the virtual circuits 910. Each of the virtual circuits 910 is associated with a virtual circuit pool of receive buffers 920. For example, virtual circuit 910a is associated with virtual circuit pool 920a. In addition to the virtual circuit pools 920, there is a common pool of receive buffers 925, associated with all the virtual circuits 910 with the first network node 900.

In a known embodiment, the number of receive buffers 59 in each of the virtual circuit pools 920 is equal to one. Further in the known embodiment, the number of receive buffers 59 in the common pool 925 is equal to xr, where x is a number of virtual circuits which have maximum throughput, and r is the number of DTUs that can be transmitted during one round trip delay period between the first network node 900 and the second network node 905. The number of virtual circuit pools 920 is equal to the maximum number of potential virtual circuits between the first network node 900 and the second network node 905.

During operation of the elements shown in FIG. 9, the first network node 900 sends DTUs to the second network node 905 over the virtual circuits 910. DTUs sent over virtual circuit 910a are stored in those receive buffers 59 within the virtual circuit pool 920a, and in those receive buffers 59 in the common pool 925. Similarly, DTUs sent over virtual circuit 910b are stored in those receive buffers 59 within the virtual circuit pool 920b, and in those receive buffers 59 in the common pool 925.

Node Processor Based Embodiment

Figure 10:
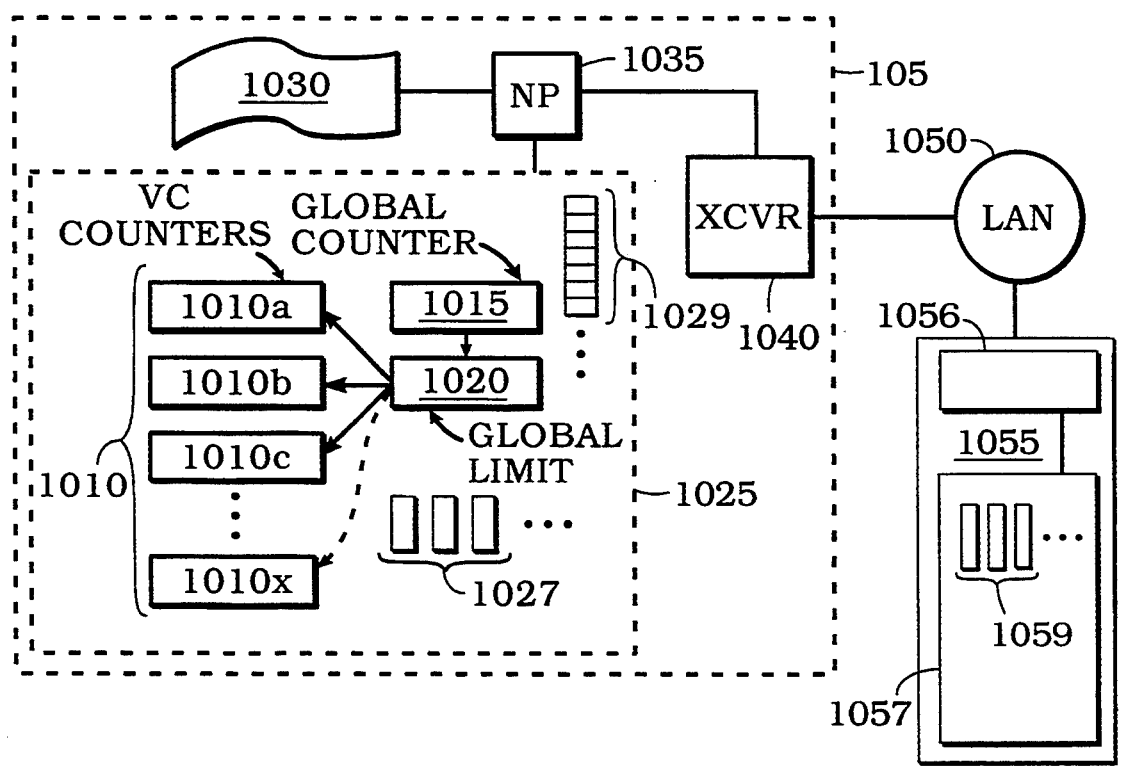
FIG. 10 is a logic drawing of an alternative embodiment of the flow control apparatus.

FIG. 10 is a logic drawing of the elements in a flow control apparatus for a communications link within a network node 1005. A plurality of virtual circuit outstanding cell counters 1010, consisting of virtual circuit outstanding cell counters 1010a, 1010b, 1010c ... 1010 max, are shown coupled with a global register 1020. The number of virtual circuit outstanding cell counters max is the maximum possible number of virtual circuits on the communications link.

In the example embodiment of FIG. 10, the virtual circuit outstanding cell counters 1010, global counter 1015, and global register 1020 are shown contained in a memory 1025. Alternatively, some or all of virtual circuit outstanding cell counters 1010, global counter 1015, and global register 1020 could be implemented as hardware registers. Further in the example embodiment of FIG. 10 are shown a node processor 1035, coupled with the memory 1025, a program 1030 running on the node processor 1035, and a transceiver circuit 1040, coupled with the node processor and a network 1050.

It will be evident to one skilled in the art of data and computer communications that the network 1050 could be a local area network (LAN), a wide area network (WAN), a metropolitan area network (MAN), or other type of communications system.

A second network node 1055 is also shown coupled with the LAN 1050. The second network node 1055 includes a transceiver 1056 coupled with the network 1050 and also coupled with a memory 1057. The memory 1057 in the second network node 1055 includes a set of one or more receive buffers 1059, for storing data received from the network 1050.

It will be evident to one skilled in the art of data and computer communications that an alternative to the embodiment in FIG. 10 would include an application specific integrated circuit (ASIC) to perform some or all of the functions performed by the program 1030 running on the node processor 1035. The selection of whether to have the functions performed by the node processor 1035 or an ASIC is based on design trade-offs, taking into account the expense of using an ASIC as balanced against the generally faster processing speeds achievable with an ASIC.

The memory 1025 further contains a virtual circuit table 1029, having an entry for each virtual circuit between the network node 5 and other network nodes on the network 1050, and a set of one or more data cells 1027, containing data to be transmitted by the network node 1005 to other nodes on the network 1050.

During operation of the elements shown in FIG. 10, the program 1030 executes on the node processor 1035. The functions performed by the program 1030 are the functions performed by the flow control logic 30 shown in the embodiment of FIG. 1d.

I claim:

1. A flow control apparatus for a communications system having multiple connections between a transmitting node and a receiving node, where data transmission units are transmitted from said transmitting node to said receiving node over said multiple connections, said receiving node comprising:

a first predetermined number of receive buffers for storing data transmission units received from said transmitting node over any of said multiple connections; and a second predetermined number of receive buffers associated with each one of said multiple connections for storing data transmission units received over said one of said multiple connections.

2. A flow control apparatus for a communications system having multiple connections between a transmitting node and a receiving node, said receiving node having one or more receive buffers, where data transmission units are transmitted from said transmitting node to said receiving node over said multiple connections, said transmitting node comprising:

a global counter to count the number of data transmission units transmitted from said transmitting node to said receiving node, and not yet transferred out of said receive buffers in said receiving node; and flow control means, responsive to said global counter exceeding a first number, for limiting the number of data transmission units transmitted over each individual connection, and not yet transferred out of said receive buffers in said receiving node, to a second number.

3. A flow control apparatus for a communications system having multiple connections between a transmitting node and a receiving node, where data transmission units are transmitted from said transmitting node to said receiving node over said multiple connections, comprising:

a first predetermined number of receive buffers, within said receiving node, for storing data transmission units received from said transmitting node over any of said multiple connections;

a second predetermined number of receive buffers, within said receiving node, associated with each one of said multiple connections for storing data transmission units received over said one of said multiple connections;

a global counter, within said transmitting node, for counting the number of data transmission units transmitted from the transmitting node to the receiving node, and not yet transferred out of either said first predetermined number of receive buffers within said receiving node or said second predetermined number of receive buffers within said receiving node; and flow control means, within said transmitting node, responsive to said global counter exceeding said first number, for limiting the number of data transmission units transmitted over each individual connection, and not yet transferred out of either said first predetermined number of receive buffers within said receiving node or said second predetermined number of receive buffers within said receiving node, to said second number.

4. A flow control apparatus for a first network node, comprising:

an outstanding cell counter, containing the number of outstanding cells transmitted by said first network node over one of a set of one or more open virtual circuits with a second network node;

a global counter, containing the total number of outstanding cells transmitted by said first network node to said second network node over said set of one or more open virtual circuits;

a global limit register, containing a global limit; and flow control means, coupled with and responsive to said outstanding cell counter, said global counter, and said global limit register, for initializing said global limit register to the maximum number of cells that may be transmitted by said first network node during a round trip delay between said first network node and said second node, and for stopping transmission on said one of said set of one or more open virtual circuits when said outstanding cell counter has a value greater than or equal to the value of said global limit register.

5. The apparatus as in claim 4, said flow control means further comprising means for starting transmission on said one of said set of one or more open virtual circuits when said outstanding cell counter has a value less than the value of said global limit register.

6. The apparatus as in claim 4, said flow control means further comprising means, responsive to transmission of a data cell from said first network node over said one of said set of one or more open virtual circuits, for incrementing said outstanding cell counter.

7. The apparatus as in claim 4, said flow control means further comprising means, responsive to receipt by said first network node of a buffer released message from said second network node, for decrementing said outstanding cell counter.

8. The apparatus as in claim 4, said flow control means further comprising means, responsive to transmission by said first network node of a data cell over one of said set of one or more open virtual circuits, for incrementing said global counter.

9. The apparatus as in claim 4, said flow control means further comprising means, responsive to receipt by said first network node of a buffer released message from said second network node, for decrementing said global counter.

10. The apparatus as in claim 4, said flow control apparatus further comprising means, responsive to transmission of a data cell from said first network node, for recalculating the value of said global limit register.

11. The apparatus as in claim 10, said means for recalculating further responsive to said first network node receiving a buffer released message from said second network node.

12. The apparatus as in claim 11, said means for recalculating further comprising:

means for calculating a number rx equal to (r * x), said factor r equal to the number of cells said first network node can transmit during one round trip delay to said second network node, said number x equal to a predetermined number;

means for comparing said number rx with the value of said global counter; and means for setting said global limit to 1 if the value of said global counter is greater than or equal to said number rx.

13. The apparatus as in claim 12, said means for recalculating further comprising:

means for comparing a low water mark with the value of said global counter, said low water mark equal to a predetermined integer value; and means, responsive to said means for comparing said low water mark with the value of said global counter, for setting said global limit to r when the value of said global counter is less than said low water mark.

14. The apparatus as in claim 13, said means for recalculating further comprising means for setting said low water mark equal to (r * x)/2.

15. The apparatus as in claim 14, said predetermined number x equal to a predetermined number of virtual circuits, x being predetermined such that where the number of said one or more open virtual circuits is less than or equal to x, all of said one or more open virtual circuits can operate without throughput limitation due to lack of receive buffers in said second network node.

16. The apparatus as in claim 13, said means for recalculating further comprising:
means for setting said low water mark equal to (r * x).

17. The apparatus as in claim 12, said means for recalculating further comprising:
means for setting said global limit to integer values between 1 and r when said global counter is less than said number rx.

18. The apparatus as in claim 12, said means for recalculating further comprising:
means for setting said global limit to r when said global counter is less than said number rx.

* * * * *